Nov. 22, 1960       M. D. RUST       2,960,812
COTTON PICKER SPINDLE SLAT FASTENING MEANS
Original Filed Aug. 17, 1954       3 Sheets-Sheet 1
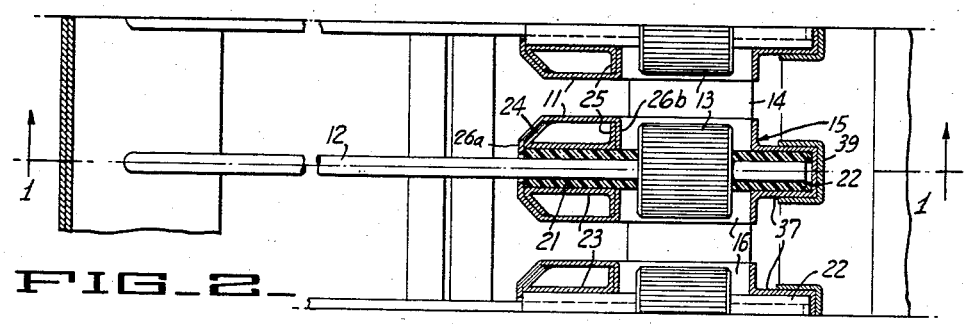
FIG_2_
FIG_1_
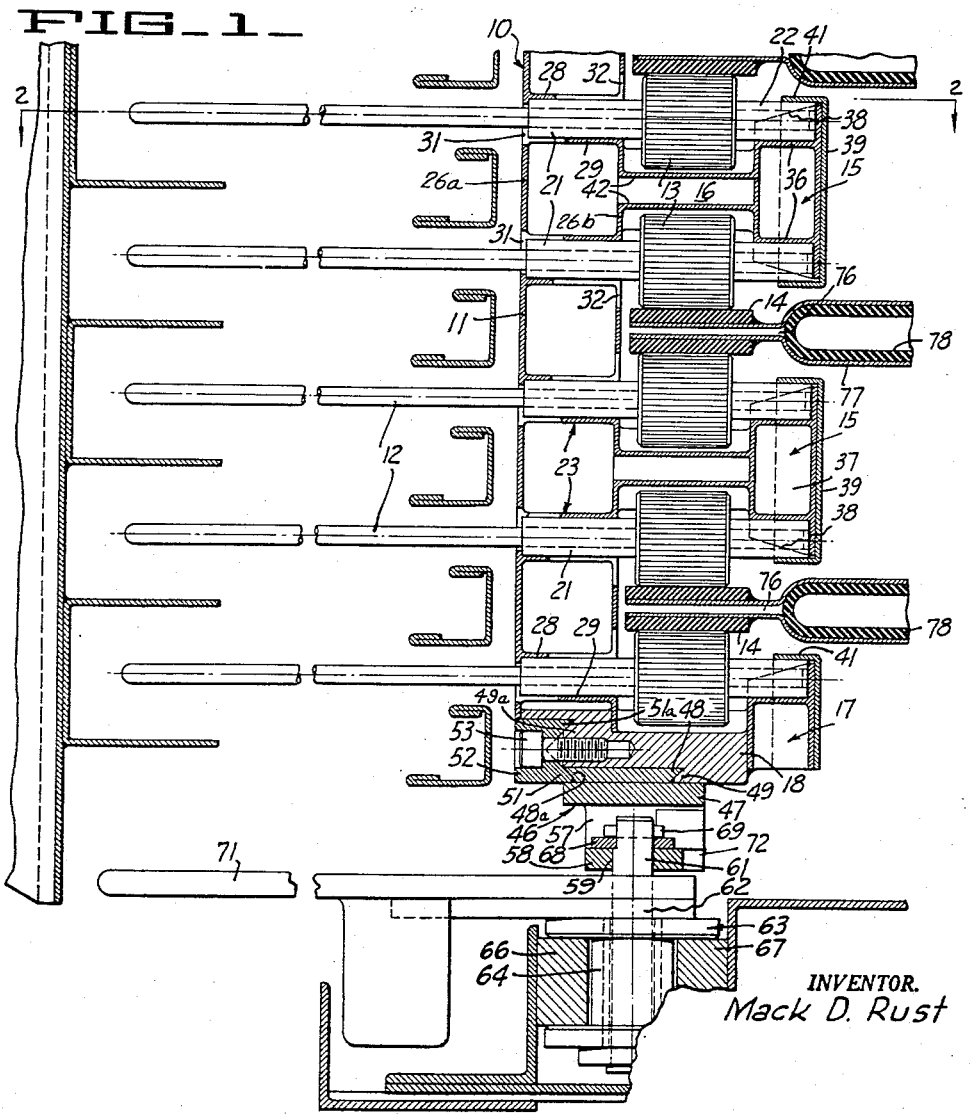
INVENTOR.
Mack D. Rust

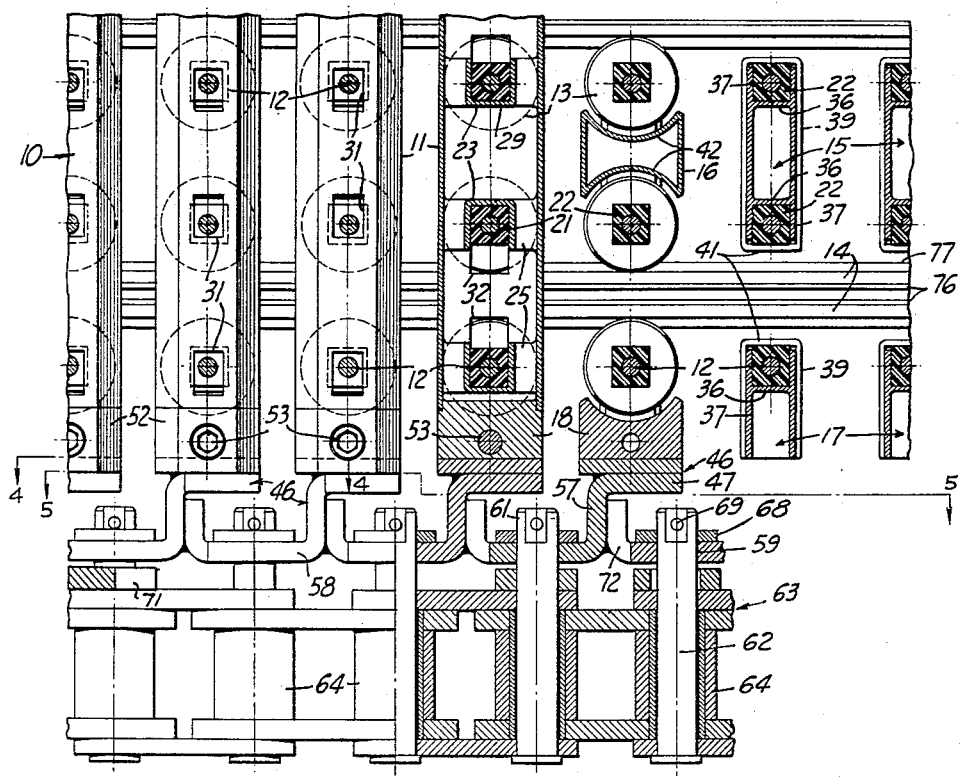

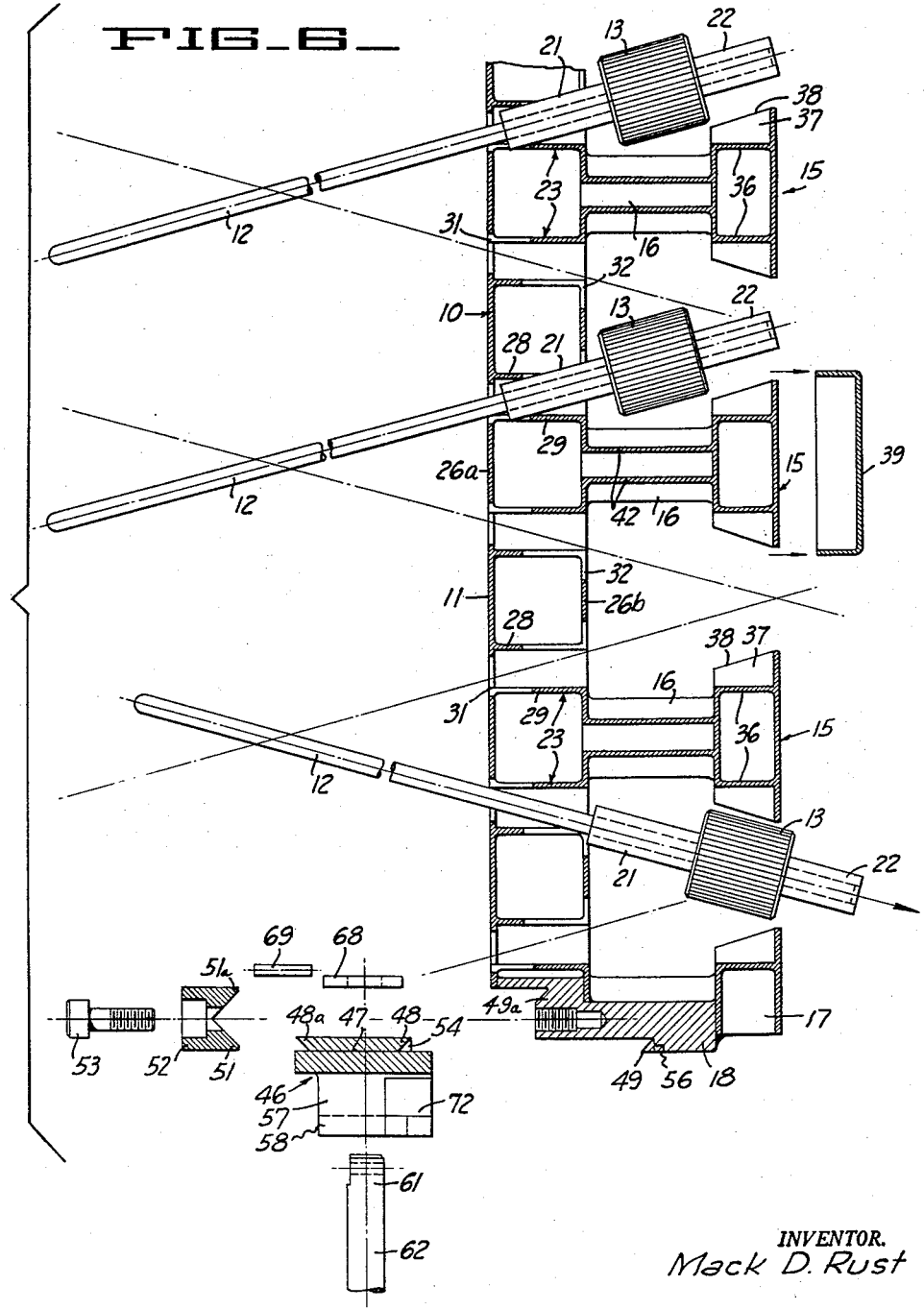
FIG_6_
INVENTOR.
Mack D. Rust

United States Patent Office 2,960,812
Patented Nov. 22, 1960

2,960,812
COTTON PICKER SPINDLE SLAT FASTENING MEANS

Mack D. Rust, P.O. Box 428, Coalinga, Calif.

Original application Aug. 17, 1954, Ser. No. 450,370, now Patent No. 2,835,096, dated May 20, 1958. Divided and this application Feb. 24, 1958, Ser. No. 718,940

10 Claims. (Cl. 56—42)

This invention relates generally to cotton picking machines of the type making use of a plurality of rotating spindles for the removal of cotton fiber from the plant boll.

The present application is a division of my copending parent application Serial No. 450,370 now Patent No. 2,835,096 filed August 17, 1954.

Conventional cotton picking machines of the rotating spindle type employ a large number of picking spindles arranged in vertically spaced rows. The spindles are adapted to progress successively through a picking zone in which they are thrust into the plants, a stripping zone in which cotton carried by the spindles is removed, and a moistening zone in which moisture is applied to the spindles before returning them to the picking zone. In one particular type of cotton picking machine, which can be referred to as the "Rust type" (see for example Patents 1,894,198, 2,058,514, 2,085,046 and 2,466,969) the spindles are carried by so-called slat and hinge assemblies, with the slats secured at their upper and lower ends to endless carriers. Each spindle is provided with a driving roller which engages a friction driving member whereby the spindle is rotated as it progresses through the picking zone. The slat assemblies which have been used in the past have been subject to certain disadvantages. The means used for attaching the ends of the slats to the endless carriers have not been entirely satisfactory. Although an effort has been made to make the slats quickly detachable from the carriers, to facilitate replacement or repair, the hinge hangers or brackets employed for this purpose have given trouble in field operations. The attaching means used for this purpose has been subject to accidental detachment, and under certain field conditions may afford difficulty in making repairs or replacements.

In general it is an object of the present invention to provide a slat assembly for a cotton picking machine which overcomes the disadvantages pointed out above.

More specifically it is an object of the present invention to provide a slat assembly having improved means for detachably securing its ends to endless carriers.

Additional objects and features of the invention will appear from the following description in which the preferred embodiment of the invention has been set forth in detail in conjunction with the accompanying drawing.

Referring to the drawing:

Figure 1 is a fragmentary sectional view taken along line 1—1 of Figure 2, illustrating a slat assembly incorporating the present invention.

Figure 2 is a cross sectional view taken along the line 2—2 of Figure 1.

Figure 3 is a front elevational view of a plurality of slat assemblies looking from the left in Figures 1 and 2 with parts omitted and other parts broken away and shown in section.

Figure 4 is a cross sectional detail taken along the line 4—4 of Figure 3.

Figure 5 is a cross sectional detail taken along the line 5—5 of Figure 3.

Figure 6 is an exploded view showing the manner in which spindles can be removed, and the parts of each slat hinge assembly.

Referring first to Figure 1 of the drawing, the slat assembly 10 is as disclosed in my copending parent application 450,370 and consists of a main frame or body part 11, which carries a vertical row of spindles 12. Each spindle is provided with a drive roller 13, which is adapted to engage a strip 14 of suitable material to provide a friction drive capable of rotating the spindle while it passes through the picking zone. The strips 14 may be carried by any suitable means, and may be yieldably urged toward driving relation with the rollers by means such as disclosed and claimed in my co-pending application Serial No. 150,914 filed March 21, 1950 now Patent 2,699,638.

The journal mounting means for the spindles includes the mountings 15, which are rigidly attached to the main body part 11 by the connecting parts 16. One mounting 15 is provided for each pair of spindles. A modified mounting 17 is provided for the lowermost spindle, and this mounting is attached by member 18 to the main slat body part 11, as will be explained in greater detail. A similar construction is provided for the upper end of the slat.

The journals for each spindle are preferably provided by the journal bushings or blocks 21 and 22. These blocks are bored to provide a proper running clearance with respect to the spindles, and in section are non-circular, as for example square, as illustrated in Figure 3. Suitable anti-friction material can be used for the construction of these blocks. For example, I can use oil impregnated porous metals, or various synthetic compounds such as nylon or Teflon.

Special seating means is provided in conjunction with the body part 11, for seating the blocks 21 in such a manner that one may readily remove these blocks together with the spindles. Before describing such seating means, it may be pointed out that the body part 11, which in effect forms the backbone structure for the slat, can be fabricated from sheet metal to have a cross-section substantially as illustrated in Figure 2. Within the body part 11 I provide, at spaced intervals along the length thereof, the journal block seating means 23. The ends of these journal seats can be provided with flanges 24 and 25, to facilitate attachment to the front and rear walls 26a and 26b of the body part 11, as by welding, brazing, and the like. As viewed in plan, the width of the seat 23 is slightly greater than the width of the corresponding block 21. The upper and lower walls 28 and 29 of the seat are of limited length, as illustrated in Figure 1. An opening 31 is provided in the front wall 26, to loosely accommodate the spindle. Also an opening 32 is formed in the rear wall, to accommodate the rear end of the block during assembly or removal. Note that the openings 32 and 31 are extended downwardly and upwardly respectively. The limited length of the walls 28 and 29, together with openings 31 and 32, permits each block and the spindle to be shifted to a position such as shown in Figure 6, to enable its removal. While the spindle and the block 21 are in horizontal position, or in other words at right angles to the length of the body part 11, the journal block 21 is adequately retained by the seat 23.

The construction of each mounting 15 can be best understood by reference to Figure 3. It can be fabricated of sheet metal as indicated, and the upper and lower ends form seats or saddles 36 for the journal blocks 22. The side walls 37 which define the seats or saddles can be cut away on the contour line 38, as shown in Figure 1. The remote ends of both the seats 36 are open except insofar as they are closed by the removable member 39 (Figure 1). This member is in the form of a small box, which can be made of suitable material such as sheet metal, and which is adapted to be clipped over the mounting 15 and retained thereon by friction or suitable latching means. When in normal position the end walls 41 of this member extend across the blocks 22, thus locking these blocks within the seats 36. It will be evident that when the member 39 is removed, either one or both of the associated spindles can be swung out of its seat 36 as shown in Figure 6, and then the spindle removed together with the journal blocks and the driving roller 13.

The parts 16 are in effect short cantilever members, which form a rigid connection between the main body part 11 and the mountings 15. They can be contoured as illustrated particularly in Figure 3. In this instance the upper and lower walls 42 are curved to generally conform to the peripheries of the driving rollers 13.

Previous reference has been made to the mounting 17 and the member 18 at each end of the slat assembly. The member 18 can be made of a casting or forging of proper strength, and is suitably secured to the lower end of the body part 10, as by welding or brazing. Each member 18 serves to mount a removable hinge hanger or bracket 46. Each hinge bracket preferably consists of a mounting plate 47, which has the beveled or dovetailed elements releasably engaging complementary elements carried by member 18 of the slat assembly. A first dovetail element 49 carried by the slat assembly interfits a mating dovetail element 48 rigidly connected to the hinge bracket 46. A second dovetail element 49a carried by the slat assembly is positioned with its beveled portion substantially parallel to but offset from the first dovetail element 49. A matching dovetail element 48a rigidly connected to the hinge bracket 46 has a beveled portion spaced vertically from the second dovetail element 49a. The releasable locking lug 52 has a beveled portion 51a engaging the second dovetail element 49a and a beveled portion 51 engaging the matching dovetail element 48a. The lug 52 is carried by the screw 53 which is threaded into the member 18 and serves to hold the assembly firmly together. As shown particularly in Figure 4 it is desirable for the plate 47 to be provided with a straight lug 54, which interlocks with the recess 56 in member 18, the latter recess also interrupting the dovetail element 49. This interlocking arrangement serves to insure a fixed location for the member 18 relative to the plate 47.

It will be evident that with the arrangement described above, one can remove the bracket 46 from the member 18 by loosening the screw 53 sufficiently far to permit the plate 47 to be removed relative to the dovetail or beveled portions 49 and 51.

Each of the complete brackets 46 also includes the offset portion 57, and an arm portion 58. Arm portion 58 extends parallel to the plate 47. The free end of the arm portion 58 is provided with an opening 59 for accommodating the extended end 61 of a link pin 62. This link pin is a part of one of the endless carrier chains 63. The chain as illustrated in Figure 1 also includes guide rollers 64 which operate between the guide trackways 66 and 67 of the machine frame. Retraction of the link pin from the arm 58 is prevented by suitable means such as the provision of washers 68 and cotter pin 69. The lower endless chain 63 in this instance is also shown serving to carry the devices 71 which are in the form of plates having fingers which engage the stalks of the plant, as the machine advances over a row of plants being picked.

While the picking spindles are passing through the picking zone of the machine they are substantially at right angles to the links of the carrier chains to which the slat assemblies are attached. This is substantially the position illustrated in the drawing. It is desirable for the brackets 46 to be provided with lugs 72, thereby limiting swinging of the brackets in a clockwise direction as viewed in Figure 5. These lugs are shown carried by the offset portions 57 of the brackets, and are each adapted to abut the arcuate surface 73 of the adjacent arm 58.

As previously stated the members 14 frictionally engage the peripheries of the drive rollers 13, whereby the rollers and spindles are rotated as the slat assemblies are moved through the picking zone. Members 14 can be attached to any suitable support means, or for this purpose I can utilize an arrangement substantially as illustrated in my co-pending application Serial No. 150,914, now Patent No. 2,699,638, filed March 21, 1950. Such means consists of metal members 76 to which the members 14 are secured, and which in turn are secured to the members 77 that are movable relative to each other in a vertical direction. The members 77 serve to enclose a resilient tube 78, within which a predetermined fluid pressure is maintained.

Operation of the slat assembly described above is as follows: Assuming that all of the spindles are properly assembled with respect to the backbone part 11 and the journal mountings 15 and 17, movement of the slats by driving the carrier chains causes the rollers 13 to be moved by frictional engagement with members 14, with rotation of the picking spindles. These spindles rotate freely within the journal blocks 21 and 22, which as previously explained can be made of suitable material, such as nylon. The main body 10 of the slat assembly frame has sufficient inherent strength to maintain all of the picking spindles in the desired alignment. When it is necessary to service one or more of the slats, the cap 39 is removed from the mounting 15, and the spindle cocked to an angle as illustrated in Figure 6 and retracted. Thereafter a new spindle, together with the journal blocks 21 and 22, can be re-applied by initially inserting it while disposed on an angle as illustrated in Figure 6, and thereafter seating the journal 22 within its associated mounting 15, and returning the locking cap 39.

If one should desire to remove an entire slat assembly, this can be done by loosening the upper and lower screws 53, whereby the locking lugs 52 are retracted to permit removal of the plates 47 with respect to the members 18. A new slat assembly can now be applied to the machine, and thereafter the brackets 46 rigidly fixed with respect to the members 18, by tightening the screws 53. These operations are carried out when the slat is in a position in which removal and insertion of the slat assembly is not prevented by the proximity of other parts, such as the drive members 14. The same also applies to replacement of spindles.

I claim:

1. In a cotton picker, the combination of a vertically extending slat member for mounting rotary picking spindles, a hinge member pivotally connectable on a vertical pivotal axis with a horizontally movable endless slat carrier, a first dovetail element rigidly connected with one of said members, the said dovetail element having a beveled portion extending in the general direction of movement of said slat carrier, the other of said members having a mating dovetail element in direct engagement therewith, a second dovetail element rigidly connected with the said one of said members and positioned with its beveled portion substantially parallel to but offset from the first dovetail element, the other of said members having a matching dovetail element having a beveled portion spaced vertically from said second dovetail element, and releasable locking means cooperatively engaging said second dovetail element and said matching dovetail element for releasably interconnecting said slat and hinge members, whereby said releasable locking means may be disengaged to permit removal of said slat member from connection with said hinge member while said releasable locking means remains in loosely assembled engagement with one of said members.

2. In a cotton picker, the combination set forth in claim 1, wherein said releasable locking means comprises a dovetail locking lug and a retaining screw member having threaded engagement with one of said members on an axis extending transversely to the general direction of movement of said slat carrier.

3. In a cotton picker, the combination set forth in claim 2, wherein said locking lug comprises a block substantially rectangular in general shape and provided with a V-shaped groove extending along a vertical side thereof in the general direction of movement of said slat carrier, and wherein one wall or face of said groove provides a beveled portion operatively engaging said second dovetail element, and the other face of said groove provides a beveled portion operatively engaging said matching dovetail element.

4. In a cotton picker, the combination set forth in claim 3, wherein the said locking lug and one of said members have registering holes, and wherein said screw member is a capscrew extending through the hole in said locking lug and having threaded engagement with the said member for a distance substantially greater than the amount of retraction of the said locking lug required to permit separation or reassembly of the said slat and hinge members, whereby to permit dismounting said slat member from said hinge member or to reassemble same merely by loosening said screw a predetermined amount and without removing said lug or said screw from said member with which said screw is threadedly engaged when assembled in normal operative relation.

5. In a cotton picker, the combination set forth in claim 4, wherein said first dovetail element is a part of said slat member, the said mating dovetail element is a part of said hinge member, wherein said screw member has threaded engagement with an end portion of said slat, and wherein said hinge member comprises a horizontal arm or plate portion having a vertical pivot pin receiving hole and a vertically disposed offset portion rigidly connected at its lower extremity with said plate portion and at its upper extremity with a horizontal plate portion which includes the aforesaid mating and matching dovetail elements.

6. In a cotton picker, the combination set forth in claim 5, wherein said hinge member includes a lug portion operatively engaging a portion of an adjacent hinge member, whereby to limit rotation of said hinge member about said pivotal axis in one direction.

7. In a cotton picker, the combination set forth in claim 5 wherein said first dovetail element includes a recess and the mating dovetail element connected with said hinge member includes a straight lug portion operatively interlocking said recess, whereby to insure a fixed location for said slat member relative to said hinge member.

8. In a cotton picker, the combination of a vertically extending slat member for mounting rotary picking spindles, a hinge member pivotally connectable on a vertical pivotal axis with a horizontally movable endless slat carrier, a first dovetail element rigidly connected with an end portion of said slat member, the said dovetail element having a beveled portion extending in the general direction of movement of said slat carrier, the said hinge member having a mating dovetail element in direct engagement therewith, a second dovetail element rigidly connected with said end portion of said slat member and positioned with its beveled portion substantially parallel to but vertically and laterally offset from that of said first dovetail element, the said hinge member having a matching and opposing dovetail element with its beveled portion spaced vertically from said second dovetail element, and releasable locking means cooperatively engaging said second dovetail element and said matching dovetail element for releasably interconnecting said slat and hinge members, whereby said releasable locking means may be disengaged from said matching and said second dovetail elements to an extent sufficient to permit removal of said slat member from connection with said hinge member or the reassembly thereof while said releasable locking means remains in loosely assembled engagement with said slat member.

9. In a cotton picker, the combination set forth in claim 8, wherein said releasable locking means comprises a dovetail locking lug having two opposed beveled portions and a hole therebetween, and a screw member extending through the hole in said lug and having threaded engagement with said slat member on an axis extending transversely to the general direction of movement of said slat carrier, and wherein one of the beveled portions of said lug bears in operative engagement with said second dovetail element of said slat and the other operatively engages said matching dovetail element of said hinge member.

10. In a cotton picker, the combination set forth in claim 9, wherein said screw member consists of a capscrew having a head portion in load transmitting engagement with said locking lug, and a shank portion having a length of threaded engagement with said slat member substantially greater than the amount of retractive movement of said locking lug required to permit separation or reassembly of said slat and hinge members, whereby to permit dismounting said slat member from said hinge member or to assemble same by loosening said screw but without removing said lug or said screw from said slat.

References Cited in the file of this patent
UNITED STATES PATENTS

| | | |
|---|---|---|
| 2,548,069 | Rust | Apr. 10, 1951 |
| 2,668,409 | Bramblett | Feb. 9, 1954 |
| 2,705,860 | Fergason | Apr. 12, 1955 |
| 2,751,742 | Keith et al. | June 26, 1956 |